(12) United States Patent
Valenti et al.

(10) Patent No.: US 8,099,762 B2
(45) Date of Patent: Jan. 17, 2012

(54) SECURE DIGITAL CONTENT TRADING SYSTEMS AND METHODS

(75) Inventors: William L. Valenti, Seattle, WA (US); Edward P. Flinchem, Seattle, WA (US)

(73) Assignee: Integic Technologies LLC, Wilmington, DE (US)

( * ) Notice: Subject to any disclaimer, the term of this patent is extended or adjusted under 35 U.S.C. 154(b) by 1235 days.

(21) Appl. No.: 10/904,881

(22) Filed: Dec. 2, 2004

(65) Prior Publication Data

US 2005/0117747 A1 Jun. 2, 2005

Related U.S. Application Data

(60) Provisional application No. 60/526,170, filed on Dec. 2, 2003, provisional application No. 60/547,863, filed on Feb. 26, 2004.

(51) Int. Cl.
*H04L 9/00* (2006.01)
(52) U.S. Cl. ............................................. 726/3; 713/150
(58) Field of Classification Search ................ 726/1–10, 726/17–21, 27–30, 32; 713/153, 171–172, 713/179, 185, 189, 193; 380/228–230, 232, 380/255, 37, 277–285, 44, 28–30; 709/203, 709/219, 223–225, 230–232; 705/56, 18
See application file for complete search history.

(56) References Cited

U.S. PATENT DOCUMENTS

| | | | |
|---|---|---|---|
| 5,878,135 A | | 3/1999 | Blatter et al. |
| 5,889,861 A | * | 3/1999 | Ohashi et al. ................. 380/247 |
| 6,061,451 A | | 5/2000 | Murantani et al. |
| 6,925,562 B2 | * | 8/2005 | Gulcu et al. .................. 713/172 |
| 7,065,340 B1 | * | 6/2006 | Einola et al. .................. 455/410 |
| 7,149,310 B2 | * | 12/2006 | Sandhu et al. ................. 380/278 |
| 7,159,114 B1 | * | 1/2007 | Zajkowski et al. ........... 713/171 |
| 7,334,128 B2 | * | 2/2008 | Ganesan et al. .............. 713/168 |
| 7,380,282 B2 | * | 5/2008 | Song et al. ...................... 726/29 |
| 7,533,065 B2 | * | 5/2009 | Piikivi ............................ 705/76 |
| 7,607,015 B2 | * | 10/2009 | Fascenda ...................... 713/171 |
| 7,636,826 B2 | * | 12/2009 | Okaue et al. .................. 711/164 |

OTHER PUBLICATIONS

The International Search Report and Written Opinion for PCT/US2004/40669 mailed on Dec. 15, 2005.
The International Preliminary Report on Patentability, PCT/US2004/040669 issued on Jun. 7, 2006.

* cited by examiner

*Primary Examiner* — Kimyen Vu
*Assistant Examiner* — Leynna Truvan

(57) ABSTRACT

Systems and methods for securely performing digital commerce. A user device provides a first key and a random number to a server over a first network, encrypts the random number and a user identifier using the first key, and sends the encrypted information to the server via a second network. The server generates an encryption of the random number, the user identifier, and a second key using the first key. The user device receives, decrypts and stores the second key. If the user device wants digital content, the server encrypts the digital content using a digital content key and encrypts the digital content key using the second key. The user device receive the encrypted contents, decrypts the digital content key using the second key and decrypts the digital content using the decrypted digital content key. Digital content can be passed to other user devices.

26 Claims, 5 Drawing Sheets

SECURE DIGITAL CONTENT TRADING SYSTEMS AND METHODS

CROSS-REFERENCE TO RELATED APPLICATIONS

This invention claims the benefit of U.S. Provisional Application Ser. No. 60/526,170 filed Dec. 2, 2003 and U.S. Provisional Application Ser. No. 60/547,863 filed Feb. 26, 2004, which are hereby incorporated by reference.

BACKGROUND OF THE INVENTION

The incredible growth of the Internet has excited businesses and consumers alike with its promise of changing the way we live and work. However, a major concern has been just how secure the Internet is, especially when sending sensitive information.

The following information must be securely transmitted:
Credit-card information;
Social Security numbers;
Private correspondence;
Personal details;
Sensitive company information; and
Copyrighted media (e.g., sound recordings, videos, literary works, etc.)
Bank-account information.

Currently, information security is provided on computers and over the Internet by a variety of methods. A simple but straightforward security method is to only keep sensitive information on removable storage media like floppy disks. However, the most popular forms of security all rely on encryption, the process of encoding information in such a way that only the person (or computer) with a secret key can decode it.

Most computer encryption systems belong in one of two categories: Symmetric-key encryption; and Public-key encryption.

In symmetric-key encryption, each computer has a secret key (code) that it can use to encrypt a packet of information before it is sent over the network to another computer. Symmetric-key requires that you know which computers will be talking to each other so you can install the secret key on each one. Symmetric-key encryption is essentially the same as a secret code that each of the two computers must know in order to decode the information. The code provides the key to decoding the message.

Public-key encryption uses a combination of a private key and a public key. The private key is known only to your computer, while the public key is given by your computer to any computer that wants to communicate securely with it. To decode an encrypted message, a computer must use the public key, provided by the originating computer, and its own private key. A very popular public-key encryption utility is called Pretty Good Privacy (PGP), which allows one to encrypt almost anything.

Encryption methods in a wireless commercial application environment is performed by one of the above-identified methods. However, those methods provide limited capabilities of what an end user, someone who receives digital content at their cellular phone, for example, can do with the received digital content. Therefore, there exists a need to provide a secured digital content data transmission system that allows recipients some secure control over transmission of digital content. Insert background of the invention here.

BRIEF SUMMARY OF THE INVENTION

The present invention provides systems and methods for securely performing digital commerce. A computer-based user device generates a first key and a random number, sends the generated first key and random number to a server over a first network, encrypts the random number and an identifier associated with the user device using the first key, and sends the encrypted information to the server via a second network. The server generates a data package that includes an encryption of the random number, the user device identifier, and a second key using the first key. The user device receives, decrypts and stores the second key.

If the user device wants digital content, the server encrypts the digital content using a digital content key and encrypts the digital content key using the second key. The user device receive the encrypted contents, decrypts the digital content key using the second key and decrypts the digital content using the decrypted digital content key.

In one aspect of the invention, digital content encrypted using the digital content key can be passed to other user devices. The receiving user devices request access from the server, whereby the server provides the digital content key encrypted with the key associated with the requesting user.

In another aspect of the invention, the server executes a billing and compensation transaction in order to charge the user and pay the digital content owner. brief summary of the invention here.

BRIEF DESCRIPTION OF THE SEVERAL VIEWS OF THE DRAWING

Preferred and alternative embodiments of the present invention are described in detail below with reference to the following drawings.

DETAILED DESCRIPTION OF THE INVENTION

Figure 1:
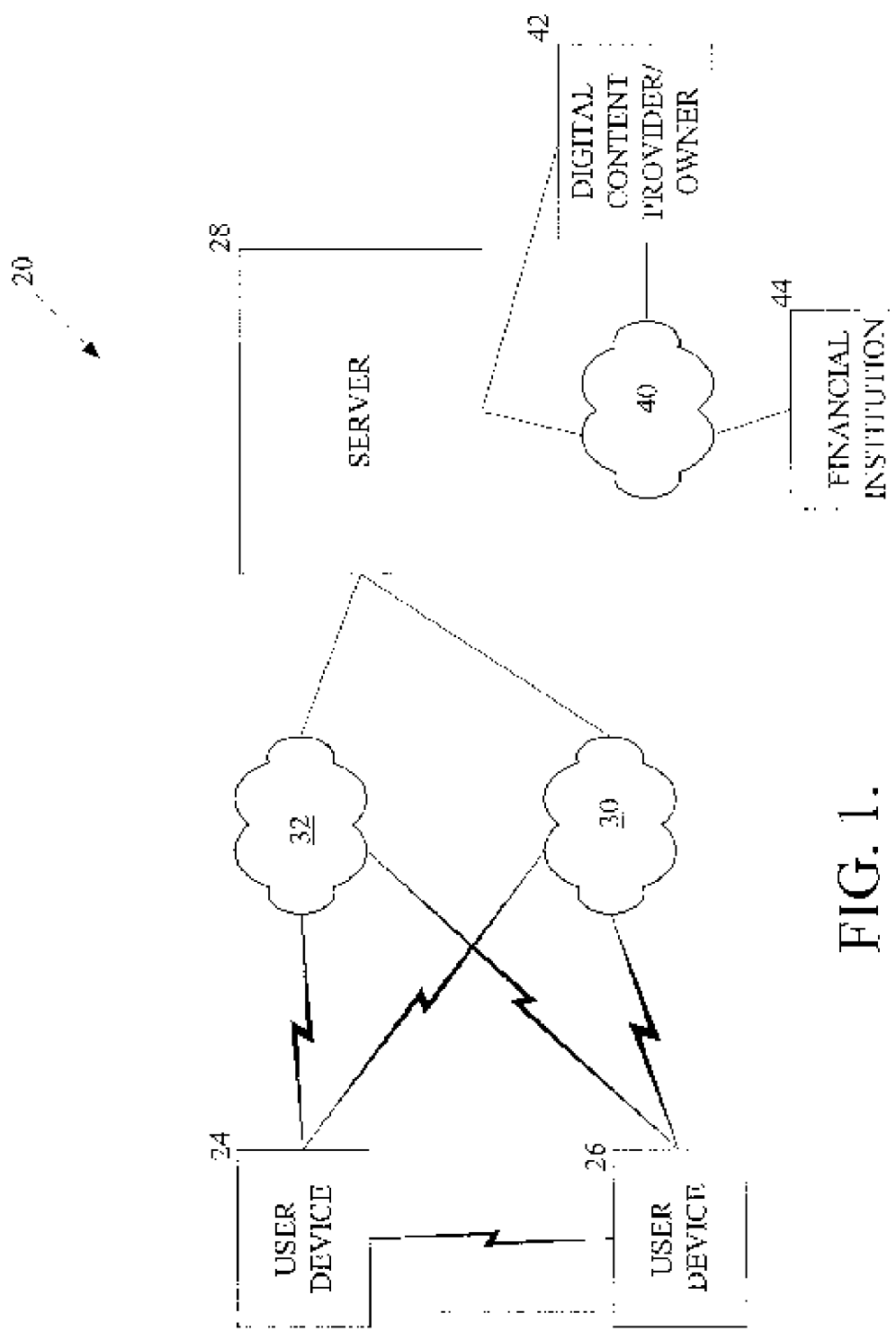
FIG. 1 illustrates a block diagram of an example system formed in accordance with the present invention.

As shown in FIG. 1, a system 20 performs secure transmission of digital content in order to allow for expanded commercial opportunities. The system 20 includes a plurality of user devices 24 and 26 that are in wireless communication with a server 28 via first and second data networks 30 and 32. Examples of the user devices include any of the number of various forms of wireless devices, such as cellular phones, personal data assistance, palmtop or laptop computers, etc. The server 28 is a computer system with local memory that is also directly or indirectly in communication with one of a number of digital content provider/owners 42 and one or more financial institutions 44. In one embodiment, the server 28 is in communication with the digital content provider/owners 42 and the financial institutions 44 over a network 40.

The user devices 24 and 26 use the networks 30 and 32 to separately transmit different data associated with an encryption method to the server 28. The server 28 authenticates each user device 24 and 26 based on the received data and provides each of the user devices 24 and 26 with new secret encryption keys. The new secret encryption keys are used to decrypt digital content requested by the user devices 24 and 26 that are sent from the server 28. The server 28 either directly compensates digital content provider/owner for the sale of associated digital content to the users of the user devices 24 and 26 or provides some other form of compensation (e.g., credit) with the aid of the financial institution 44.

Figure 2:
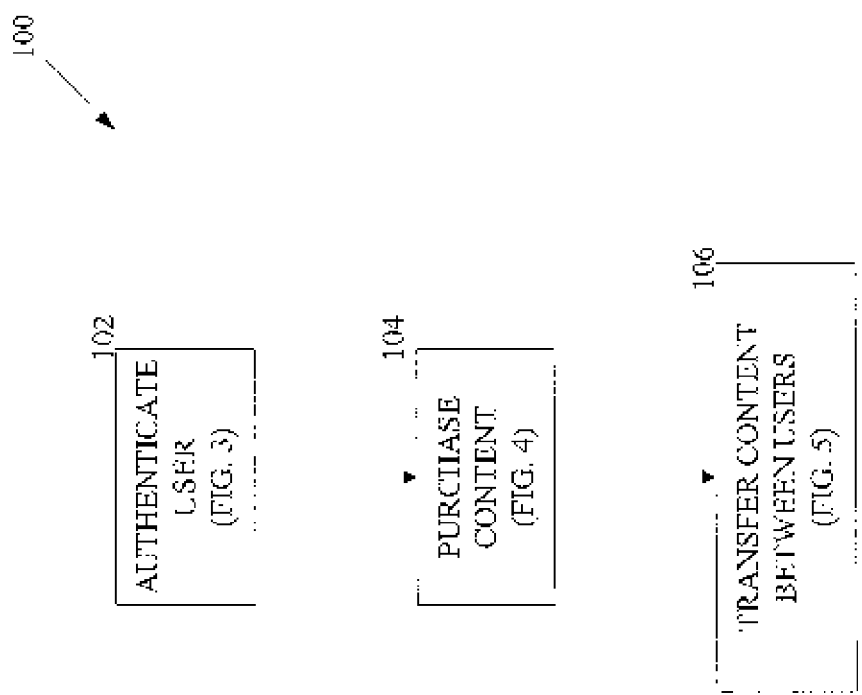
FIGS. 2-5 are full diagrams that illustrate example processes performed by components of the system shown in FIG. 1.

In one embodiment, the network 30 is a general packet radio service (GPRS) wireless data network and the network 32 is a short message service center (SMSC) wireless data network. The network 40 is one of a private or public data network, such as the Internet. FIG. 2 illustrates a method 100 performed by the components shown in FIG. 1. At a first block 102, a user device 24 or 26 is authenticated. The authentication process is described in more detail below with regard to FIG. 3. At a block 104, digital content is purchased. The digital content purchasing process is described in more detail below with regard to FIG. 4. At a block 106, transfer of digital content between users is provided. Transfer of digital content between users is described in more detail below with regard to FIG. 5.

Figure 3:
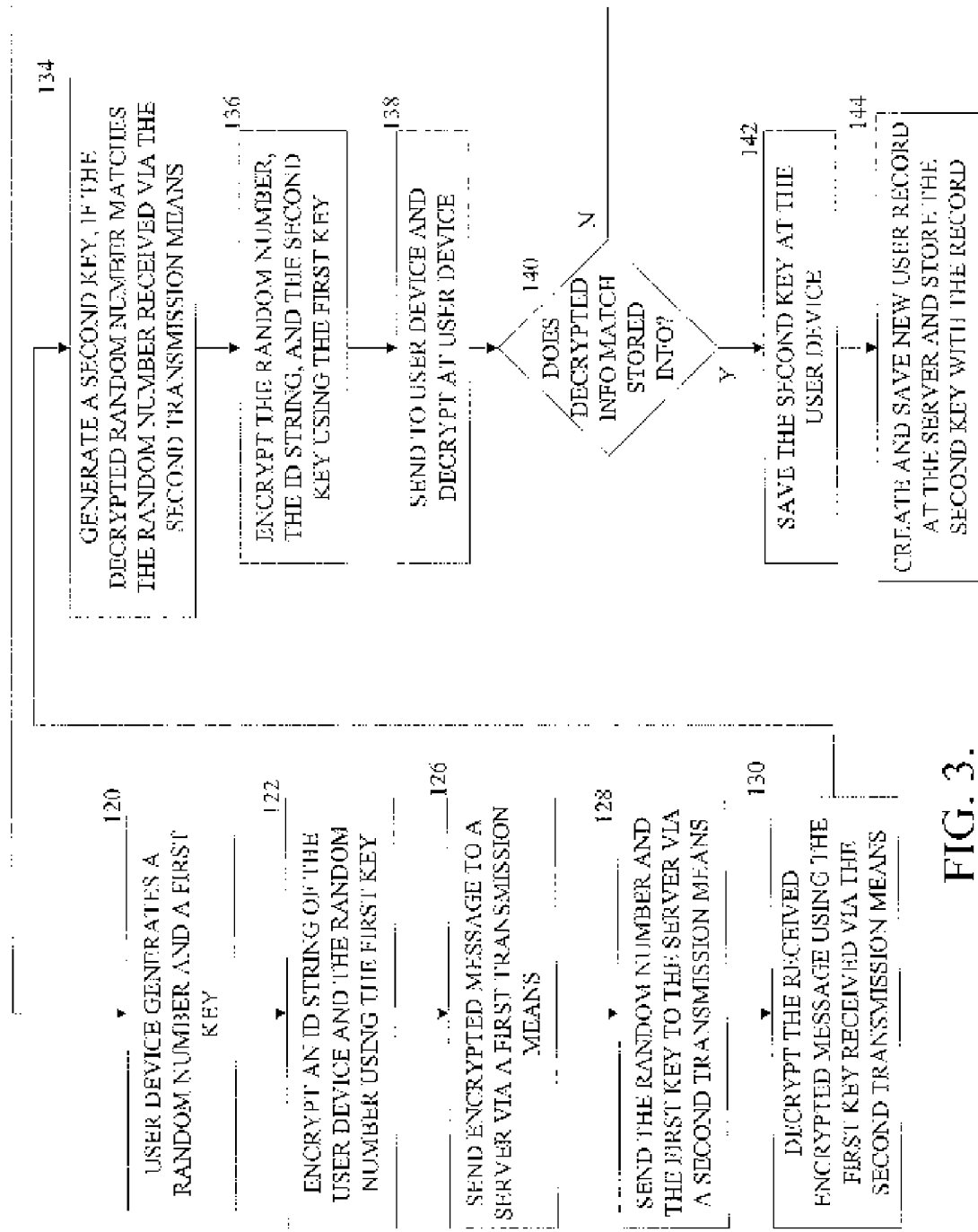

FIG. 3 illustrates the authentication process from block 102 of FIG. 2. At a block 120, a user device generates a random number and a first key. At a block 122, the user device encrypts an identification (id) string associated with the user device and the random number using the first key. At a block 126, the encrypted id string and random number are sent to the server via a first transmission means, i.e., the first network 30. At a block 128, the random number and the first key are sent unencrypted to the server 28 via a second transmission means, i.e. the second network 32. Then at a block 130, the server 28 decrypts the received encrypted message using the first key received via the second transmission means. At a block 134, the server 28 generates a second key, if the decrypted random number matches the random number received via the second transmission means. At a block 136, the server 28 encrypts the random number, the id string, and the second key using the first key and at a block 138, sends this new encrypted package to the user device. At a decision block 140, the random number and id string are decrypted and compared to the random number and id string stored at the user device. If the comparison shows that a match has occurred, then at a block 142, the user device saves the second key. At a block 144, the server 28 creates and saves a new user record using the id string and stores the second key in the record. If the comparison between the decrypted random number and id string shows that a match has not occurred, then an error message is presented and/or the process returns to block 120.

In another embodiment, the information encrypted and sent to the user device (blocks 136, 138), may be any information that would be uniquely known by the user device. Thus, the encrypted information may include just the random number.

Figure 4:
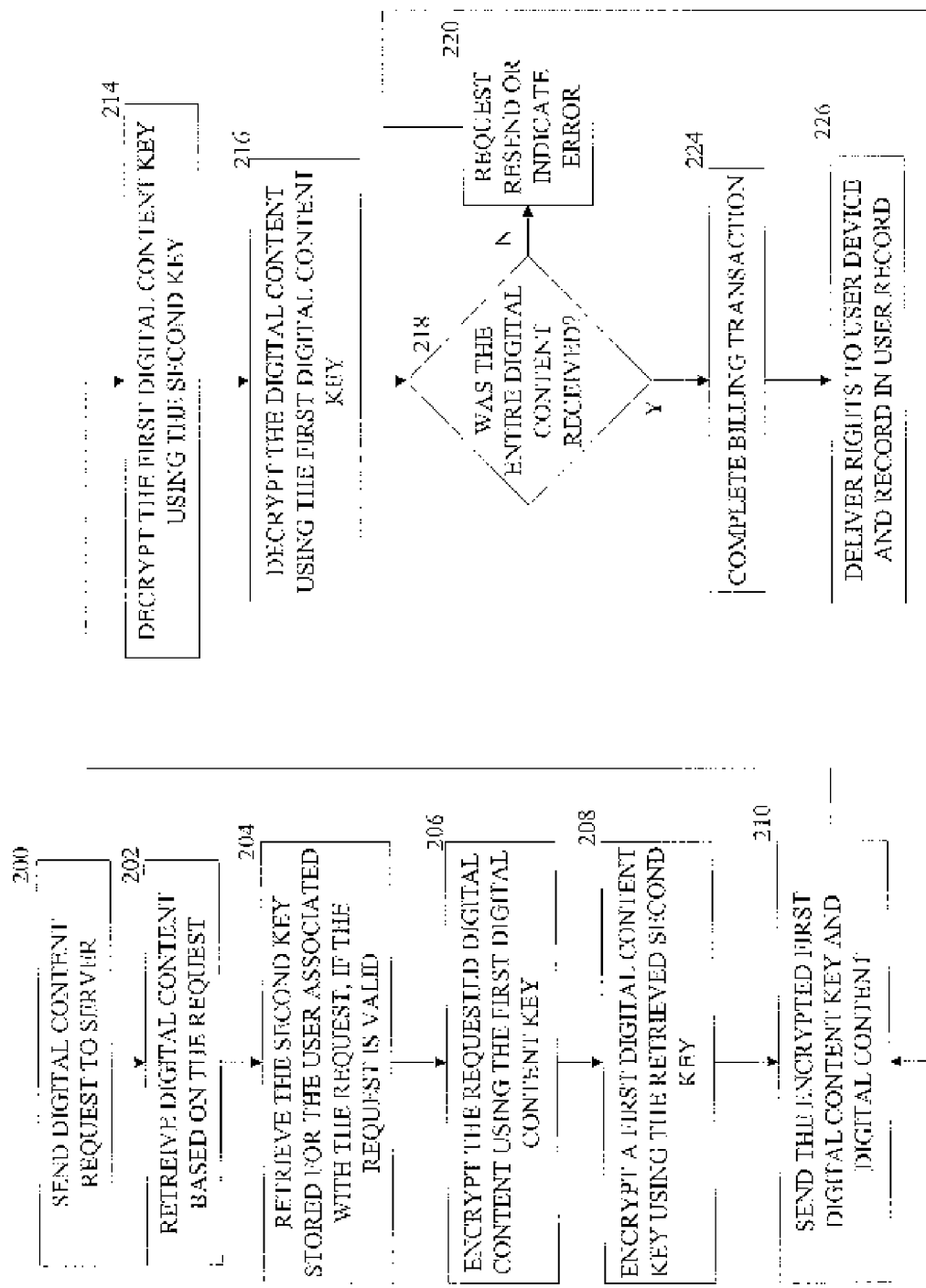

FIG. 4 shows an example process performed at the block 104 of FIG. 2. First at a block 200, a user device sends a request for digital content to the server 28. At a block 202, the server 28 retrieves the requested digital content. The server 28 may retrieve digital content from a local storage device or may retrieve it from the digital content provider/owners 42 or from some other source over the network 40. At a block 204, the server 28 retrieves the second key stored for the user associated with the request, if the request is valid. The request is determined valid based on analysis of the user's ability to pay for the requested digital content. In one embodiment, the server 28 or similar device determines if the user has credit to their account (i.e., have they prepaid (prepay)). In another embodiment, the server 28 or similar device determines if the user is worthy of credit (i.e., can they be billed (postpay)). In still another embodiment, the server 28 or similar device determines if the user has a credit account (e.g. credit card) that can be billed.

At a block 206, the server 28 encrypts the requested digital content using the first digital content key. At a block 208, the server 28 encrypts a first digital content key using the retrieved second key and, at a block 210, sends the encrypted first digital content key and digital content to the user device that made the digital content request. At a block 214, the user device decrypts the first digital content key using the previously stored second key. At a block 216, the user device decrypts the digital content using the first digital content key. At a decision block 218, the user device determines if the entire digital content was received. If the entire digital content was not received, then at block 220, the user device requests that the server 28 resends and/or indicates an error. If the digital content was properly received, then at block 224 the server 28 completes a billing transaction. At a block 226, the server 28 deliver rights to user device and records the transaction in the user's record.

Figure 5:
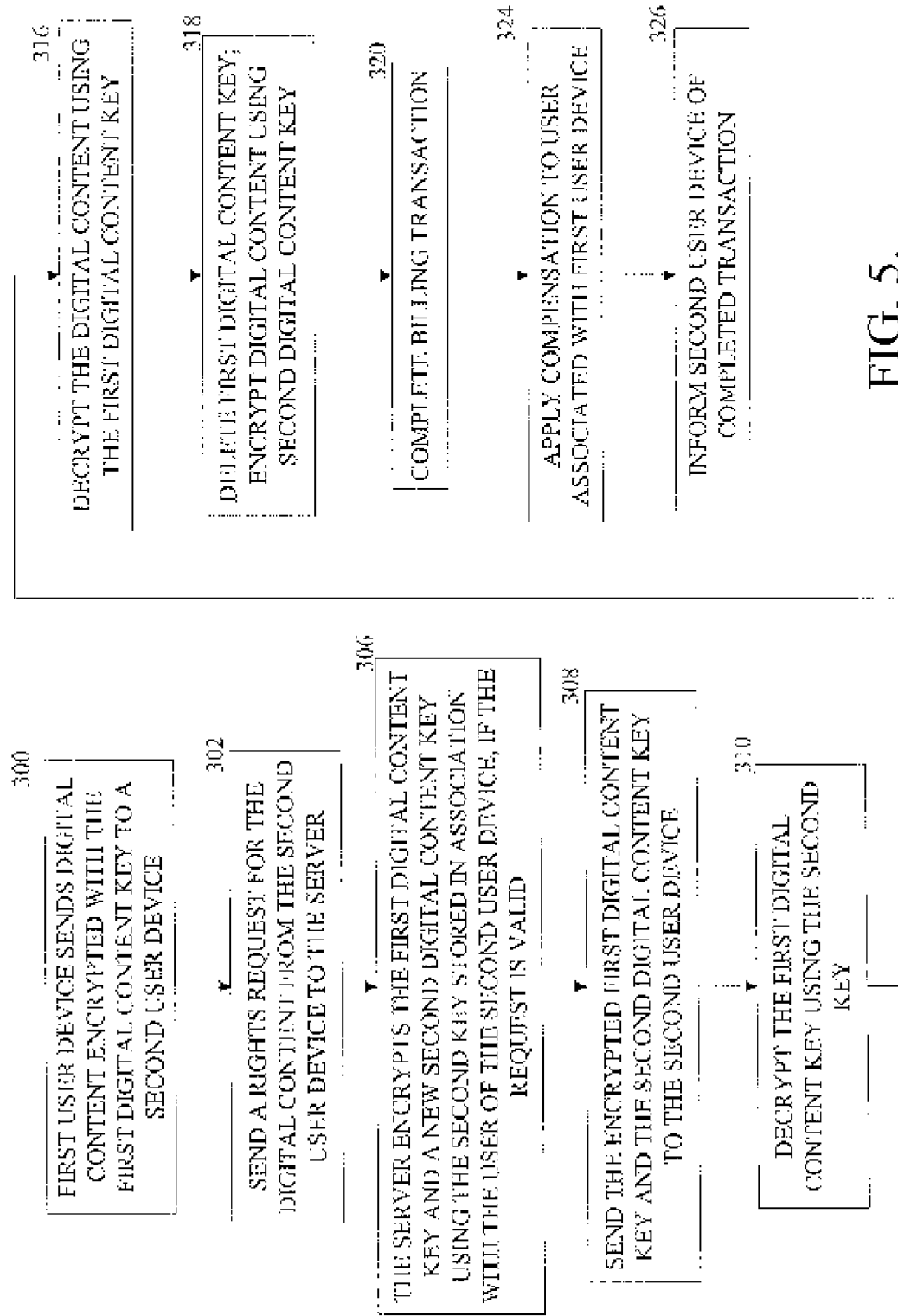

FIG. 5 illustrates an example process for transferring digital content between user devices 24 and 26. First at a block 300, the first user device 24 sends digital content encrypted with the first digital content key to the second user device 26. At a block 302, the second user device 26 sends a request for rights to open and use the digital content to the server 28. At a block 306, the server 28 encrypts the first digital content key and a new second digital content key using the second key stored in association with the user of the second user device 26, if the request for rights is determined valid (see block 204 of FIG. 4). At a block 308, the encrypted first digital content key and the second digital content key are sent to the second user device 26. At a block 310, the second user device 26 decrypts the first and second digital content keys using the second key, at a block 316, decrypts the digital content using the first digital content key, and at block 318, deletes the first digital content key and encrypts the digital content using the second digital content key. In another embodiment, encryption of the digital content using the second digital content key is not performed. At a block 320, the server 28 bills the user of the second user device 26 and compensates the digital content provider/owner 42. At a block 324, the server 28 applies compensation to the user associated with first user device 24. At a block 326, the server 28 informs the second user device 26 of completion of transaction.

Billing and compensating users or content providers can be performed a number of ways. For example, the financial institutions 44 may be instructed to by the server 28 to debit or apply credit to accounts associated with the participating parties. It is appreciated that other forms of billing or compensation may be used, such as sending a monthly bill or cutting a check for the compensation amount.

When digital content is transferred between two user devices, data transmission charges are avoided because there is no use of the networks 30 and 32. Thus, a monetary benefit can be applied to the user receiving or sending the digital content in the form of a discount or purchasing credit. Also, the cost savings of the peer-to-peer digital content transfer may be passed on to the operator of the server 28 and/or the digital content provider/digital rights owner 42. The server 28 distinguishes between digital content transactions that occur over the networks 30 and 32 and digital content transactions that occur between user devices 24 and 26 with only minimal use of the networks 30 and 32. Delivery of digital content over either one of the networks 30 and 32 can incur a significant cost due to the size of the information being sent. Thus, limiting data delivery over the networks 30 and 32 provides a cost savings.

While the preferred embodiment of the invention has been illustrated and described, as noted above, many changes can be made without departing from the spirit and scope of the invention. Accordingly, the scope of the invention is not limited by the disclosure of the preferred embodiment.

The invention claimed is:

1. A method performed by a computer-based device, the method comprising:
   generating a first key and a random number;
   sending the first key and the random number to a server over a first network, wherein the first network provides a first communication path between the computer-based device and the server;
   encrypting the random number and an identifier associated with the computer-based device to create first encrypted information, wherein the random number and the identifier are encrypted using the first key;
   sending the first encrypted information to the server via a second network, wherein the second network provides a second communication path between the computer-based device and the server;
   receiving second encrypted information over one of the first network or the second network, wherein the second encrypted information includes the random number, the identifier, and a second key;
   decrypting the second encrypted information using the first key; and
   storing the second key.

2. The method of claim 1, wherein the first network and the second network include wireless data communication components.

3. The method of claim 2, wherein the first network includes a short message service center.

4. The method of claim 2, wherein the second network includes a general packet radio service.

5. The method of claim 1, further comprising:
   sending a request for digital content to the server over one of the first network or the second network;
   receiving encrypted digital content from the server, wherein the encrypted digital content is encrypted using a digital content key;
   receiving an encrypted digital content key from the server, wherein the encrypted digital content key is encrypted using the second key;
   decrypting the encrypted digital content key using the second key to obtain the digital content key; and
   decrypting the encrypted digital content using the digital content key to obtain the digital content.

6. The method of claim 1, wherein the computer-based device is at least one of a cellular phone or a personal data assistant.

7. A computer-based apparatus comprising:
   means for generating a first key and a random number;
   means for sending the first key and the random number to a server over a first network, wherein the first network provides a first communication path between the computer-based apparatus and the server;
   means for encrypting the random number and an identifier associated with the computer-based device to create first encrypted information, wherein the random number and the identifier are encrypted using the first key;
   means for sending the first encrypted information to the server via a second network, wherein the second network provides a second communication path between the computer-based apparatus and the server;
   means for receiving second encrypted information from the server over one of the first network or the second network, wherein the second encrypted information includes the random number, the identifier, and a second key;
   means for decrypting the second encrypted information using the first key; and
   means for storing the second key.

8. The apparatus of claim 7, wherein the first network and the second network include wireless data communication components.

9. The apparatus of claim 8, wherein the first network includes a short message service center.

10. The apparatus of claim 9, wherein the second network includes a general packet radio service.

11. The apparatus of claim 7, further comprising:
    means for sending a request for digital content to the server over one of the first network or the second network;
    means for receiving encrypted digital content from the server, wherein the encrypted digital content is encrypted using a digital content key;
    means for receiving an encrypted digital content key from the server, wherein the encrypted digital content key is encrypted using the second key;
    means for decrypting the encrypted digital content key using the second key; and
    means for decrypting the encrypted digital content using the digital content key.

12. The apparatus of claim 7, wherein the computer-based apparatus is at least one of a cellular phone or a personal data assistant.

13. A method performed by a computer-based server, the method comprising:
    receiving, from a device, a first key and a first random number over a first network, wherein the first network provides a first communication path between the device and the computer-based server;
    receiving first encrypted information over a second network, wherein the second network provides a second communication path between the device and the computer-based server, and wherein the first encrypted information includes a second random number and an identifier associated with the device;
    decrypting the first encrypted information using the first key;
    comparing the first random number to the second random number;
    if the first random number is the same as the second random number, generating a second key; and
    sending a data package to the device, wherein the data package includes the first random number, the identifier, and the second key, and further wherein at least a portion of the data package is encrypted using the first key.

14. The method of claim 13, wherein the first network and the second network include wireless data communication components.

15. The method of claim 14, wherein the first network includes a short message service center.

16. The method of claim 14, wherein the second network includes a general packet radio service.

17. The method of claim 13, further comprising:
    receiving a request for digital content from the device;
    encrypting the digital content with a digital content key to create encrypted digital content;
    encrypting the digital content key using the second key to create an encrypted digital content key;
    sending the encrypted digital content key and the encrypted digital content to the device; and
    sending billing information for the digital content to the device.

18. The method of claim 17, further comprising:
receiving a second request from a second device to use the digital content, wherein the second device receives the digital content from the device;
determining whether the second device is authorized to use the digital content; and
if the second device is authorized to use the digital content, sending a second data package to the second device, wherein the second data package includes the digital content key.

19. The method of claim 18, further comprising sending a discount or a credit to the device or the second device.

20. A computer-based server apparatus comprising:
means for receiving a first key and a first random number over a first network from a device, wherein the first network provides a first communication path between the device and the computer-based server apparatus;
means for receiving first encrypted information from the device over a second network, wherein the second network provides a second communication path between the device and the computer-based server apparatus, and wherein the first encrypted information includes a second random number and an identifier associated with the device;
means for decrypting the first encrypted information using the first key;
means for comparing the first random number to the second random number;
means for generating a second key and associating the second key with the identifier if the first random number is the same as the second random number;
means for generating a data package, wherein the data package includes the first random number, the identifier, and the second key, wherein at least a portion of the data package is encrypted using the first key; and
means for sending the data package to the device via one of the first network or the second network.

21. The apparatus of claim 20, wherein the first network and the second network include wireless data communication components.

22. The apparatus of claim 21, wherein the first network includes a short message service center.

23. The apparatus of claim 21, wherein the second network includes a general packet radio service.

24. The apparatus of claim 20, further comprising:
means for receiving a request for digital content from the device;
means for encrypting the digital content with a digital content key to create encrypted digital content;
means for encrypting the digital content key using the second key to create an encrypted digital content key;
means for sending the encrypted digital content key and the encrypted digital content to the device; and
means for providing compensation to an owner of the digital content.

25. The apparatus of claim 20, further comprising:
means for receiving a second request from a second device to use the digital content, wherein the second device receives the digital content from the device;
means for determining whether the second device is authorized to use the digital content; and
means for sending a second data package to the second device if it is determined that the second device is authorized, wherein the second data package includes the digital content key encrypted using the second key.

26. The apparatus of claim 25, further comprising means for providing one of a discount or a credit to the device or the second device.

\* \* \* \* \*

UNITED STATES PATENT AND TRADEMARK OFFICE
CERTIFICATE OF CORRECTION

| | | |
|---|---|---|
| PATENT NO. | : 8,099,762 B2 | Page 1 of 1 |
| APPLICATION NO. | : 10/904881 | |
| DATED | : January 17, 2012 | |
| INVENTOR(S) | : Valenti et al. | |

It is certified that error appears in the above-identified patent and that said Letters Patent is hereby corrected as shown below:

Column 5, line 32, in Claim 5, delete "comprising;" and insert -- comprising: --.

Column 6, line 11, in Claim 11, delete "comprising;" and insert -- comprising: --.

Signed and Sealed this
Third Day of July, 2012

David J. Kappos
*Director of the United States Patent and Trademark Office*